KINESCOPE COUPLING CIRCUIT

Filed Oct. 9, 1958

INVENTORS
CLYDE W. HOYT &
LUCIUS P. THOMAS, JR.
BY W. H. Sprague
ATTORNEY

United States Patent Office 2,995,622

Patented Aug. 8, 1961

2,995,622

KINESCOPE COUPLING CIRCUIT

Clyde W. Hoyt, Pennsauken, and Lucius P. Thomas, Jr., Woodcrest, N.J., assignors to Radio Corporation of America, a corporation of Delaware Filed Oct. 9, 1958, Ser. No. 766,288
3 Claims. (Cl. 178—7.5)

This invention relates to coupling circuits and more particularly to coupling circuits between the video amplifiers and the kinescope of a television receiver.

The video signal produced by a television camera and transmitted on a carrier by a television transmitter includes an average direct current component upon which the varying video signal is superimposed. The direct current component of the signal is determined partly by the type of scene being viewed by the television camera. With a predominantly white scene there will be little direct component, but with a predominantly black or dark scene the direct component will be high. Many present day television receivers provide coupling only for the alternating or varying component of the signal between the video amplifiers and the kinescope. This, of course, does not transmit the direct component of the signal and black images that are viewed on the kinescope face may vary in blackness depending upon the image content.

Video amplifiers, of course, may be fully direct coupled to the kinescope to transmit the average direct value, or a direct current restorer may be used at the input circuit of the kinescope. If, however, the various transmitting stations do not maintain the black level of the transmitted video signal at the same value, it will be necessary for the user of the television receiver to vary the contrast control to provide the most desirable picture. The kinescope also may not have sufficient dynamic range to accommodate properly a full direct coupled video signal.

It is, therefore, an object of this invention to provide an improved coupling circuit between the video amplifiers and the kinescope of a television receiver.

It is a further object of this invention to provide a partial direct coupling of the video signal from the video amplifiers to the kinescope of a television receiver in order to more truly reproduce a transmitted television image.

Briefly, a television receiver system having a pair of video amplifiers driving a kinescope is provided with direct signal coupling between the video detector and the first video amplifier. The second video amplifier is coupled for alternating signals to the first video amplifier and its output signal is coupled for alternating signals to the control grid of a kinescope. A portion of the signal available at the output of the first video amplifier is direct coupled to the cathode of the kinescope. These connections provide a partial direct coupling to the kinescope from the video amplifiers which results in a truer presentation of the image transmitted on the face of the kinescope.

Figure 1:
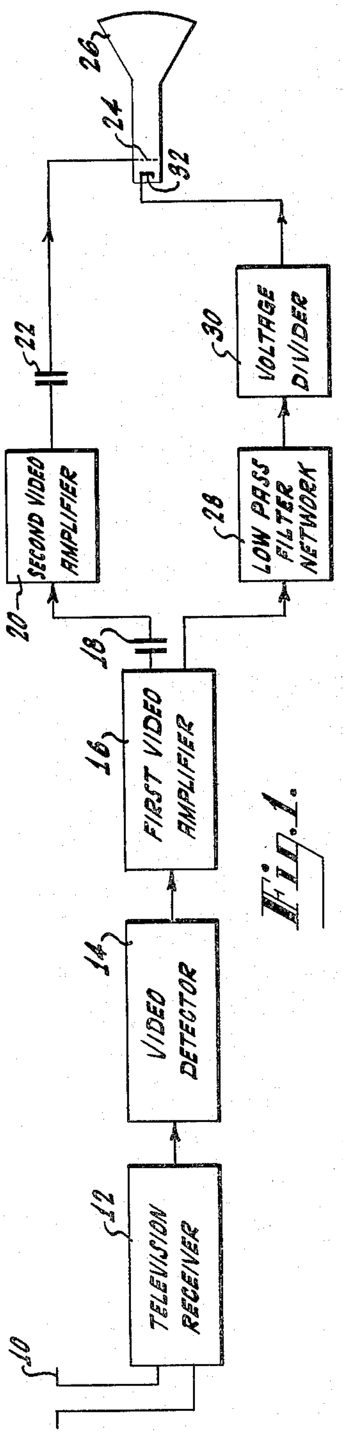
Figure 2:
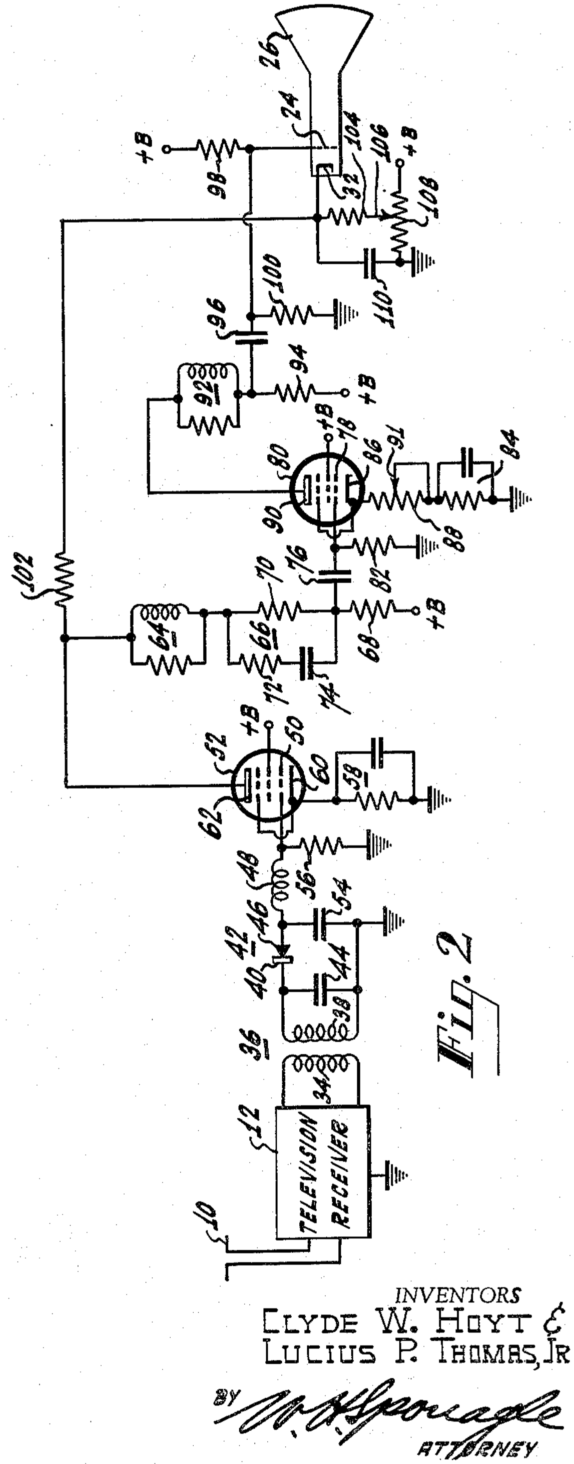

The invention may be more fully understood when the following description is read in connection with the accompanying drawings, in which:

FIGURE 1 is a block diagram of a television receiver system illustrating the general manner of operation of the invention; and FIGURE 2 is a schematic circuit diagram of a television receiver system illustrating in greater detail an embodiment of the invention.

Referring now to FIGURE 1, the television receiver system includes an antenna 10 to intercept and supply a transmitted television signal to a television receiver 12. The television receiver 12 includes radio frequency amplifier, mixer, and intermediate frequency amplifier circuits, and may be of any conventional design. The intermediate frequency signal available from the television receiver 12 is applied to a video detector 14 which detects the intermediate frequency signal and provides the video signal which is further applied to a first video amplifier 16. From the first video amplifier 16 a portion of the video signal is applied through a coupling capacitor 18 to a second video amplifier 20 and the amplified signal from the second video amplifier 20 is applied through a second coupling capacitor 22 to the control grid 24 of a kinescope 26.

Another portion of the signal from the first video amplifier 16 is direct coupled to a low pass filter network 28. After the video signal has passed through the low pass filter 28 it is applied to a voltage divider 30, and a portion of the direct coupled signal is applied from the voltage divider 30 to the cathode 32 of the kinescope 26. The sound, synchronizing, deflecting, and automatic gain control circuits of the usual television receiver have not been illustrated in the interest of simplicity, since these circuits may be entirely conventional.

It will be noted that, with the exception of the low pass filter 28 and the voltage divider 30, the television receiver system just described is conventional. The full bandwidth video signal is AC coupled through the second video amplifier 20 to the control grid 24 of the kinescope 26; AC coupled meaning that all but the very low alternating and direct components of the video signal are coupled to the control grid 24. The direct signal coupling through the low pass filter 28 will be observed to be in the correct polarity to aid the AC coupled signal that is applied to the control grid 24, since the AC coupled signal that is applied to the control grid 24 suffers a phase reversal in the second video amplifier tube 20 and the direct coupled signal is not reversed through the low pass network 28. The signals aid since they are applied to different electrodes of the kinescope 26.

Only the low frequency portions of the video signal are applied to the kinescope cathode, thus only a partial direct coupling of the video signal is effected. Full direct coupling may not be desired in all cases since, as stated before, the dynamic capabilities of the kinescope may be insufficient to properly reproduce a full direct coupled video signal. The voltage divider network 30 serves to reduce the amount of direct signal that is applied to the cathode 32, since the direct signal will normally be available from the anode of an amplifier tube which, under most circumstances, will be at a direct potential that is too high to be directly applied to the kinescope 26.

The partial coupling of the direct component of the video signal serves to provide a truer reproduction of the signal received by the receiver, since a portion of the direct component, including the low frequency alternating or varying components, is applied to the kinescope 26 at the cathode 32. Thus, on relatively dark scenes, the average background on the kinescope face will remain more nearly that which was transmitted than will a receiver that provides only AC coupling between the video amplifiers and the kinescope.

Referring now to FIGURE 2, a television receiver system again includes an antenna 10 and a television receiver 12 which perform the same functions as described in connection with FIGURE 1. The intermediate frequency available from the television receiver 12 is applied to the primary winding 34 of an intermediate frequency transformer 36. The secondary winding 38 of transformer 36 has one terminal connected to ground and the other terminal connected to the cathode 40 of a diode 42 which serves as a video detector. The secondary winding 38 is tuned by a capacitor 44 to the intermediate frequency. The anode 46 of the diode 42 is connected through a radio frequency choke 48 to the control grid 50 of a first video amplifier tube 52. The anode 46 of the diode 42 is also connected to ground through a capacitor 54 and a direct current return is provided for both the diode 42 and the control grid 50 of the tube 52 by a resistor 56 connected between the control grid 50 and ground.

The detected video signal is available across the direct current return resistor 56 and is applied to the control grid 50 of the first video amplifier 52. Cathode bias for the first video amplifier tube 52 is provided by a resistor-capacitor biasing circuit 58 connected between the cathode 60 and ground. Amplified video signals are available at the anode 62 of the tube 52 and are applied across the inductor-resistor peaking circuit 64, a low frequency boosting circuit 66, and a video load resistor 68. The peaking circuit 64 may be of a conventional series peaking type. The low frequency boosting circuit 66 includes a resistor 70, shunted by the series combination of a resistor 72 and a capacitor 74, and is serially connected between the peaking circuit 64 and the video load resistor 68.

Normal video signals are developed across the video load resistor 68 and applied through a coupling capacitor 76 to the control grid 78 of a second video amplifier tube 80. The control grid 78 is returned to ground through a resistor 82. Cathode bias for the second video amplifier tube 80 is provided by a second resistor-capacitor network 84 which is connected between ground and the cathode 86 of the tube 80 through a contrast control potentiometer 88. Variation of a tap 91 on the contrast control potentiometer 88 varies the gain of the amplifier tube 80 to vary the contrast of an image on the face of the kinescope 26 in the normal manner. Amplified signals from the tube 80 are available at the anode 90 thereof and applied through a series peaking inductor-resistor network 92 across a second video load resistor 94. Video signals appearing across the second video load resistor 94 are applied through a coupling capacitor 96 to the control grid 24 of the kinescope 26. The control grid 24 is biased by a voltage divider network comprising a pair of serially connected resistors 98 and 100 connected between a source of positive operating potential, +B, and ground. Operating potential is supplied to the amplifier tubes 52 and 80 by connecting the low signal ends of the video load resistors 68 and 94 to the source of operating potential, +B. The control grid 24 is connected to the junction of the resistors 98 and 100. It will thus be seen that nearly full bandwidth video signals will be amplified and A.C. coupled to the control grid 24 of the kinescope 26.

In order to provide the partial direct coupling described with respect to FIGURE 1, a resistor 102 is connected directly between the anode 62 of the first amplifier tube 52 and the cathode 32 of the kinescope 26. The cathode 32 is also connected through a resistor 104 to a tap 106 on a potentiometer 108 which is connected between the source of operating potential, +B, and ground. Variation of the tap 106 on the potentiometer 108 serves as a brightness control for the kinescope 26. The cathode 32 is also connected to ground for high frequency video signals by a capacitor 110.

The purpose of the low frequency boosting circuit 66 in the anode circuit of the first amplifier tube 52 is to provide a boost or peaking of the low frequency components of the video signal. These low frequency components include, inter alia, the synchronizing portions of the television video signal. The synchronizing circuits normally connected with the receiver have not been illustrated in the interest of simplicity and may be, for the purpose of this invention, entirely conventional. The low frequency boosting circuit 66 provides an additional load for the low frequency portions of the signal. The capacitor 74 has an appreciable impedance at low frequency and direct video signals, but not at high frequency video signals. Thus, little of the high frequency video signals will be developed across the low frequency boosting circuit 66, while a considerable portion of the low frequency video signals will be developed thereacross. Direct current boost is additionally aided by the high direct operating potential on the anode 62 of the first video amplifier tube 52. This allows a high degree of voltage division to be made providing isolation between the kinescope 26 and the anode 62 of the tube 52, while at the same time insuring a relatively large coupling of the direct video component to the kinescope 26. Thus, the direct and low frequency video signals will be coupled through the resistor 102 to the cathode 32 of the kinescope 30, but will be attenuated by the voltage divider action of the resistors 102, 104 and 108. The circuit thus applies nearly full bandwidth video signals to the grid 24 and the low frequency components of the video signal including the direct component to the cathode 32.

The circuit described will provide partial direct coupling of the video signals to the kinescope to provide a truer reproduction of the image on the face of the kinescope with little increase in circuit complexity and cost.

Having thus described the invention what is claimed is:

1. A signal coupling circuit for applying a video signal to a kinescope having a pair of control electrodes comprising in combination, a source of video signal, first and second video amplifiers each having signal input and output circuits and providing a signal phase reversal between said input and output circuits, means for direct coupling said source of video signal to the signal input circuit of said first video amplifier, means for applying all but the low frequency and direct components of said video signal from the signal output circuit of said first video amplifier to the signal input circuit of said second video amplifier, further means providing an alterating current connection between the signal output circuit of said second video amplifier and one of the pair of control electrodes of said kinescope, and low pass filter means for applying only the low frequency and direct components of said video signal from the output circuit of first video amplifier to the other of said pair of control electrodes.

2. In a television system including a kinescope having a cathode and control electrode and first and second video amplifiers, each of said video amplifiers providing a signal phase reversal therethrough, the combination comprising, a source of video signal having direct and alternating signal components, direct current coupling means for applying said video signal directly to said first video amplifier, alternating current coupling means connected between said first and said second video amplifiers for applying all but the low frequency and direct components of said video signal to said second video amplifier, and a further coupling means for all but the low frequency and direct components of said video signal connected between said second video amplifier and the control grid of said kinescope and low pass filter means connected between said first video amplifier and the cathode of said kinescope for applying only the low frequency and direct components of said video signal to said cathode.

3. A signal coupling circuit for applying a video signal to a kinescope having a cathode and a control electrode comprising in combination, video detector means for developing a video signal having alternating and direct components, first and second video amplifier means, each having a signal input and signal output circuit and providing a signal phase reversal between its input and output circuits, direct current coupling means connected between said video detector and the input circuit of said first video amplifier means for applying said video signal thereto, alternating signal coupling means for applying only alternating components of said video signal from the output circuit of said first video amplifier to the input circuit of said second video amplifier, further alternating signal coupling means connected between the output circuit of said second video amplifier and the control electrode of said kinescope, and direct current coupling means including a low pass filter connected between the output circuit of said first video amplifier and the cathode of said kinescope for applying the direct component of said video signal to said cathode.

References Cited in the file of this patent

UNITED STATES PATENTS

| | | |
|---|---|---|
| 2,740,071 | Goldmark | Mar. 27, 1956 |
| 2,865,991 | Risner | Dec. 23, 1958 |